United States Patent
Walian et al.

(10) Patent No.: US 7,590,957 B2
(45) Date of Patent: Sep. 15, 2009

(54) METHOD AND APPARATUS FOR FIXING BEST CASE HOLD TIME VIOLATIONS IN AN INTEGRATED CIRCUIT DESIGN

(75) Inventors: Frank A. Walian, Damascus, MD (US); John S-H Kim, Columbia, MD (US)

(73) Assignee: LSI Corporation, Milpitas, CA (US)

( * ) Notice: Subject to any disclaimer, the term of this patent is extended or adjusted under 35 U.S.C. 154(b) by 419 days.

(21) Appl. No.: 11/509,370

(22) Filed: Aug. 24, 2006

(65) Prior Publication Data

US 2008/0052652 A1 Feb. 28, 2008

(51) Int. Cl.
*G06F 17/50* (2006.01)

(52) U.S. Cl. .................................. 716/6; 716/4; 716/5
(58) Field of Classification Search ............... 716/4–6
See application file for complete search history.

(56) References Cited

U.S. PATENT DOCUMENTS

| | | | | |
|---|---|---|---|---|
| 5,259,006 A * | 11/1993 | Price et al. | ................ | 375/356 |
| 5,475,830 A * | 12/1995 | Chen et al. | ................ | 716/16 |
| 6,546,531 B1 * | 4/2003 | Quach et al. | ................ | 716/6 |
| 6,898,724 B2 * | 5/2005 | Chang | ................ | 713/500 |
| 7,325,211 B1 * | 1/2008 | Bistry | ................ | 716/6 |
| 2001/0007144 A1 * | 7/2001 | Terazawa | ................ | 716/6 |
| 2002/0178427 A1 * | 11/2002 | Ding et al. | ................ | 716/12 |
| 2003/0101399 A1 * | 5/2003 | Yoshikawa | ................ | 714/744 |
| 2004/0139410 A1 * | 7/2004 | Ghameshlu et al. | ................ | 716/6 |
| 2005/0268263 A1 * | 12/2005 | Sun et al. | ................ | 716/6 |
| 2006/0245523 A1 * | 11/2006 | Pessa | ................ | 375/328 |
| 2007/0011527 A1 * | 1/2007 | Goswami et al. | ................ | 714/726 |
| 2007/0136708 A1 * | 6/2007 | Overs et al. | ................ | 716/6 |

* cited by examiner

*Primary Examiner*—Sun J Lin
(74) *Attorney, Agent, or Firm*—David D. Brush; Westman, Champlin & Kelly P.A.

(57) ABSTRACT

The disclosure is directed to a method and apparatus for fixing hold violations in an integrated circuit design. The method and apparatus trace upstream along a path in the design corresponding to the hold violation, from an end point of the path toward a start point of the path, until an element is reached that corresponds to the start point or has a fanout exceeding a predetermined fanout limit. The method and apparatus then generate an output that defines a location in the design at which to insert a delay element, such that the delay element is connected to an input of an element downstream of the element reached during tracing.

22 Claims, 3 Drawing Sheets

METHOD AND APPARATUS FOR FIXING BEST CASE HOLD TIME VIOLATIONS IN AN INTEGRATED CIRCUIT DESIGN

CROSS-REFERENCE TO RELATED APPLICATION

None.

FIELD OF THE DISCLOSURE

The present disclosure relates to the design and analysis of an integrated circuit and, more particularly to methods of fixing timing violations in a design.

BACKGROUND

Semiconductor integrated circuits (ICs) are typically designed and fabricated by preparing a schematic diagram or hardware description language (HDL) specification of a logical circuit in which functional elements are interconnected to perform a particular logical function. The schematic diagram or HDL specification is synthesized into cells of a particular cell library. Each cell corresponds to a logical function unit, which is implemented by one or more transistors or other devices. A series of computer-aided design tools generate a netlist of the selected cells and the interconnections between the cells. The netlist is used by a floor-planner or placement tool to place the selected cells at particular locations in an integrated circuit layout pattern. The interconnections between the cells are then routed along predetermined routing layers. Once the selected cells have been placed and routed, the netlist, the cell layout definitions, the placement data and the routing data together form an integrated circuit layout definition, which is used to fabricate the integrated circuit.

During various stages of the design process, verification tools are used to verify different aspects of the design, such as the logic or analog function, the timing, and adherence to certain design rules. One measure of the performance of an IC is expressed by the time delays within the circuit, such as propagation delays, setup delays and hold delays. Propagation delays include the time required for a signal to travel from one location to another, such as from the input of a cell to the output of the cell. A setup delay is the time duration that a signal must be available at an input to a cell prior to a respective clock or other signal transition. A hold delay is the time duration that a signal must be stable after a respective clock or other signal transition.

A worst case setup violation refers to a violation that occurs at a cell input assuming that the signal path leading to that input has a worst case (maximum) delay over variations in process, voltage and temperature. A best case hold violation refers to a violation that occurs at a cell input assuming that the signal path leading to that input has a best case (minimum) delay over variations in process, voltage and temperature.

Since setup violations traditionally have been more difficult to solve than hold violations, the adjustment and repair of best case hold violations within the design process have largely become an afterthought. Hold violations are often ignored until after much of the functional verification and setup violations have been fixed. Because of this, designers often look for a minimal-effort approach.

Upon completion of cell placement, design verification and the correction of the bulk of the existing setup violations, the designer finally broaches the issue of best case hold violations. The approach the designer implements to fix these violations may often be incorporated in what can be described as an "Industry Standard Method". This method indiscriminately inserts a buffer at the input pin of the violating storage element, such as a flip-flop or memory. The method is usually implemented via manually-created Engineering Change Order (ECO) files based on the violations reported through a Static Timing Analysis (STA) tool.

The Industry Standard Method introduces a myriad of issues, including:

1. Manual identification of end point storage elements reported by the STA tool is a time consuming effort;

2. Generating ECOs without an intelligent systematic approach may create more setup violations than the number of hold violations at the beginning of the process;

3. Designers will typically attempt to minimize effort by selecting one generic buffer to solve a wide range of violations causing unnecessary iterations and possible new setup violations; and 4. By causing new setup and/or hold violations, the designer is forced to attempt to fix problems interactively in a "ping-pong" fashion.

For example, if a designer sees that a particular flip-flop has a hold time violation, the designer may insert a generic buffer at the input pin to the flip-flop, thereby delaying the incoming signal relative to the clock input. However, that flip-flop may be a common end point for paths with diverse start points. If a designer must sort through hundreds or even thousands of paths, the results may be that common end points are fixed repeatedly. Such repeated repair of a hold violation will often cause setup violations.

Improved methods and apparatus are therefore desired for fixing best case old time violations.

SUMMARY

An embodiment of the disclosure is directed to a method, which includes: (a) tracing upstream along a path within an integrated circuit design that corresponds to a hold violation, from an end point of the path toward a start point of the path, until an element is reached along the path that corresponds to the start point or has a fanout exceeding a predetermined fanout limit; and (b) generating an output that defines a location in the design at which to insert a delay element, the location being defined based on the element reached in (a).

Another embodiment of the disclosure is directed to a computer-readable medium having computer-executable instructions for performing a plurality of steps. The steps include: (a) tracing upstream along a path within an integrated circuit design that corresponds to a hold violation, from an end point of the path toward a start point of the path, until an element is reached along the path that corresponds to the start point or has a fanout exceeding a predetermined fanout limit; and (b) generating an output that defines a location in the design at which to insert a delay element, the location being defined based on the element reached in (a).

Another embodiment of the disclosure is directed to an apparatus, which includes a delay element table and a hold violation analysis tool. The delay element table includes a plurality of delay elements having different delays. The hold violation analysis tool is adapted to input data from a timing report for an integrated circuit design, which identifies a hold violation in the design and trace upstream along a path corresponding to the hold violation, from an end point of the path toward a start point of the path, until an element is reached along the path that corresponds to the start point or has a fanout exceeding a predetermined fanout limit. The apparatus selects a delay element from the plurality of delay elements in the delay element table and generates an output file that defines a location in the design at which to insert the delay element, such that the delay element is coupled to an input of an element along the path that is immediately downstream of the element reached along the path.

DETAILED DESCRIPTION OF ILLUSTRATIVE EMBODIMENTS

An embodiment of the present disclosure illustrates a systematic process for correcting best case hold violations. This process can be performed manually or can be fully automated. The process can be referred to as a "Highly Selective Method," which can be summarized as follows according to one example embodiment of the disclosure:

1. Insert delay elements at optimal points within the path being analyzed;
2. Minimize the impact of the Engineering Change Order (ECO) on other paths that share common end points;
3. Utilize a two-dimensional analysis method in order to detect when a "hard violation" will occur;
4. Intelligently select the optimal delay element type to be inserted;
5. Provide feedback to the user by gathering statistical measurements;
6. Allow for earlier staging and execution within the design process through automation; and
7. Significantly reduce the ECO iteration period and overall design cycle time.

The proposed Highly Selective Method custom tailors a solution based upon the magnitude of the hold time violation and on statistical data gathered from the design or technology.

Figure 1:
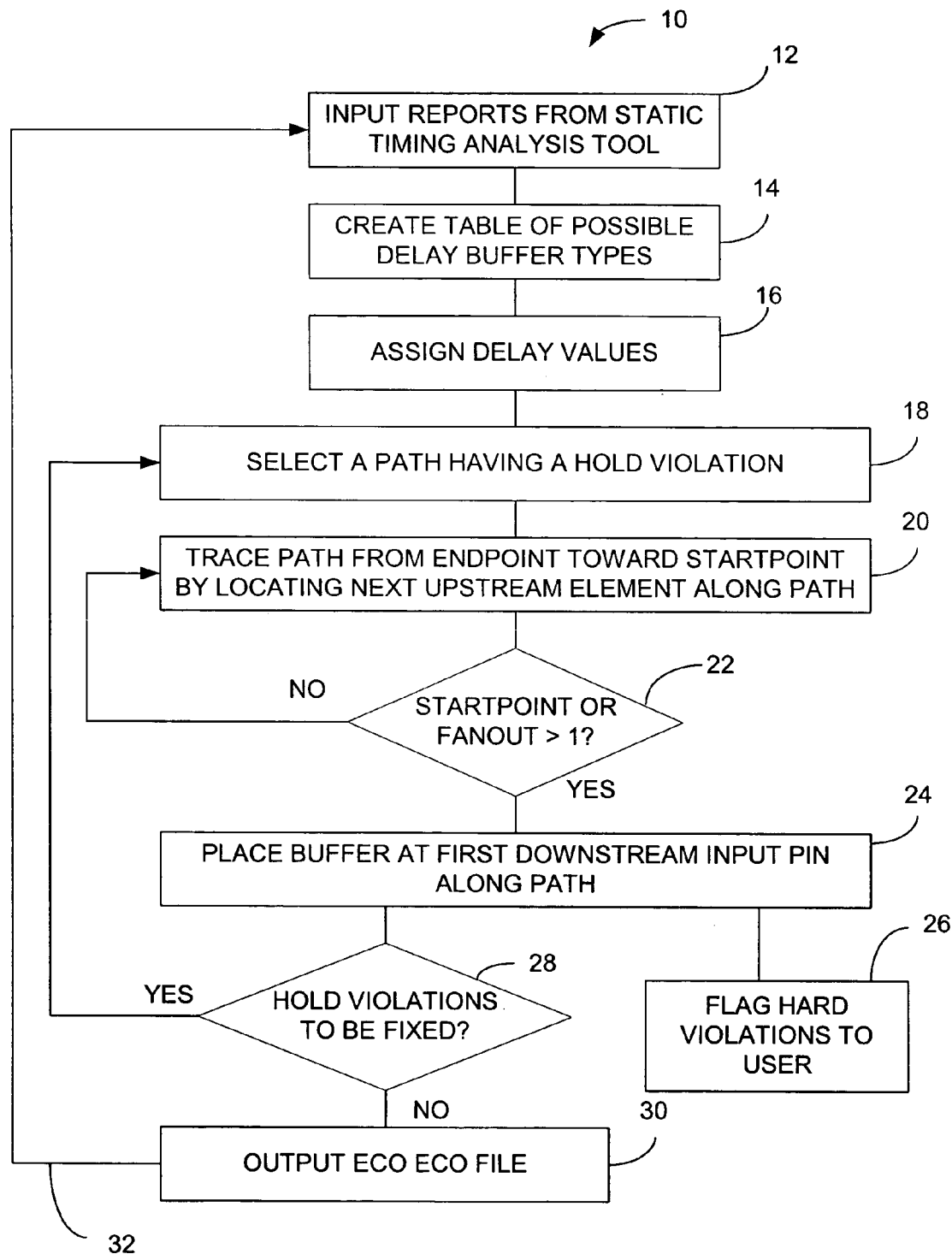
FIG. 1 is a flowchart illustrating a method of fixing hold violations according to an embodiment of the disclosure.

FIG. 1 is a flowchart illustrating the Highly Selective Method according to an embodiment of the disclosure. Method 10 begins at step 12 by inputting design reports from a Static Timing Analysis (STA) tool, for example. The STA tool generates reports or output files, which contain the gate timing, gate propagation delays and interconnect delays for the design being analyzed. For each pin-to-pin and interconnect, the STA tool provides the rising and falling transition delays. The STA files contain worst case timing reports and best case timing reports, representing timing using the slowest and fastest estimated delays, respectively, for variations in process, voltage and temperature. The delays or timing information that violate a design criteria, such as required best case hold delays, are flagged for analysis. The STA files can be imported from any STA tool, such as the PrimeTime® STA tool from Synopsys, Inc.

At step 14, method 10 creates a table of possible delay element/cell types for use in fixing hold violations. A "delay element" as used herein can include clock cells, delay cells, inverting buffer cells, non-inverting buffer cells, and any other suitable cell that provides a desired delay. In one embodiment, the delay element cells include any single input and single output cell. A list of the various delay element types can be retrieved from a corresponding cell library for the technology being used or can be created from the delay element types used in the design being verified, for example.

At step 16, method 10 assigns a respective delay value to each delay element type. In one embodiment, method 10 uses the reports generated by the STA tool to generate a statistical analysis of the delay values for each delay element type based on its capacitive load. Outliers or extreme values are removed from the list and the table is created. This can be done on a per design basis or the user can create this table. If done by the program, the table is automatically generated. If the user creates the table, the user naturally can create the table based on numerous designs in that particular technology. The program can also be configured to update the table constantly based on every IC design it analyzes for a particular technology. This results in a somewhat adaptive approach in which the delay values for the delay element types become more reasonable the more the program is used. In one exemplary embodiment, the table was created manually based on statistics received from four different IC designs.

For example in the automated embodiment, the program implementing step 16 identifies respective delay values for a plurality of different instances of each particular delay element type and then calculates a mathematical combination (such as a mean or median) of these delay values. The resulting delay value is assigned to that delay element type.

Each delay element type may have been instantiated at several different locations in the design, and these instances may have different output loading values. Therefore, each instance of a particular delay element type may have different propagation and interconnect delays than other instances of that type. When generating the delay element table, the program assigns the mean or median delay value for a plurality of instances to that particular delay element type within the table. Other mathematical functions can be used to calculate or assign a delay value for each delay element type in the table in alternative embodiments.

The following is an example of table entries for inverters having strengths "m2" and "m4":

| <delay element type> | <delay> |
|---|---|
| inm2 | 100-200 |
| inm4 | 200-400 |

The delay values shown above are fictitious values in generic time units, which are provided only for purposes of illustration.

The program can further be configured, if desired, to analyze a plurality of different capacitive loading to come up with a more refined approach to solving the issue as well. For example, multiple table entries can be created, which would minimize iterations of method 10 in future technologies. The following is an example of table entries for the inm2 and inm4 inverters, wherein different delays are provided for when the inverters are "lightly loaded", "average loaded" and "highly loaded":

| <delay element type> | <lightly loaded> | <average loaded> | <highly loaded> |
|---|---|---|---|
| inm2 | 75-100 | 100-175 | 175-200 |
| inm4 | 200-250 | 250-360 | 360-420 |

At step 18, method 10 selects one of the paths in the design having a hold violation using the best case timing report generated by the STA tool, which was input at step 12.

In steps 20, 22 and 24, method 10 locates a desired position at which to insert a delay element along the selected path for fixing the hold violation. Whereas the Industry Standard Method dictates that the solution to a hold violation is to arbitrarily place a delay element in front of the end point pin of the path, method 10 traces the path in reverse from the end point toward the start point. By doing so, it is possible to avoid potential setup violations for other paths that share the same end point.

At step 20, method 10 locates a start point and an end point of the path. The start point and end point can be defined at any element along the path. However in one embodiment of the disclosure, the start point and end point include storage elements, such as flip-flops or memories. A typical STA tool analyses the path lengths between storage elements in the design relative to clock or trigger signals. Therefore the start and end points are preferably defined at these locations.

Once the end point of the path is identified, method 10 traces backwards to locate the next upstream element along the path. At step 22, if the next upstream element is the start point of the path or if that element has a fanout of greater than one, method 10 has identified an optimal location at which to place a delay element for fixing the hold violation. The term "fanout" is defined as the number of input pins that are driven by a particular output pin.

At step 24, method 10 generates an entry in an ECO file, which defines the location at which to place the delay element relative to the element identified in step 22. In one embodiment, the location is defined as the first input pin along the path that is downstream from the element identified in step 22. This location minimizes the effect on other end points that are driven by the element having a fan out greater than one since this also minimizes the effect on other paths that end at the same end point as the path under present consideration since the delay element is not automatically placed at the input of the end point, which would effect all paths leading to that end point.

Once the desired location for the delay element has been identified, method 10 determines the amount of extra timing margin available from the worst case timing report generated by the STA tool. This information is used to determine which delay element type from the previously generated table is most appropriate. The worst case timing report identifies the setup margin for all paths that are potentially affected by the new delay element. Using the delay values associated with each delay element type and the setup margins for the affected paths, method 10 selects a delay element type having a delay that is sufficient to fix the respective hold time violation while not creating any new setup violations. If extra setup margin is available, a slightly larger than needed delay element may be used to overcompensate for issues such as cross talk and process variation that can increase the hold after placement and not affect the setup. By determining the timing margin available, overcompensation so as to create a new setup violation may be avoided.

Additionally, there may be instances in which a hard violation occurs within a path. A hard violation is defined as a situation in which a hold violation fix causes a setup violation within the same or another path. If a hold violation fix at step 24 causes a setup violation, method 10 notifies the user of the presence of a hard violation needing special attention and correction by the user, at step 26. The user can be notified in a variety of ways, such as a flag inserted in the resulting ECO output or by generating a human perceptible output such as a prompt on a display screen.

Once the location and delay element type have been selected for fixing the hold violation currently being analyzed, method 10 determines, at step 28, whether there are any further hold violations to be fixed. If so, method 10 returns to step 18 to select a further hold violation for analysis and repair. Once all hold violations have been fixed or some other terminating criteria has been reached, method 10 terminates and outputs a resulting ECO file at step 30. For example, method 10 can also be configured to terminate if the total number of hold violations remaining in the design has been reduced to less than a predetermined limit or if a certain number of iterations have been performed.

In one embodiment, method 10, outputs an Engineering Change Order (ECO) file containing a list of the design changes implemented by the method. The file defines the locations in each path at which the added delay elements shall be inserted. The ECO can have any file format with which a subsequent tool can read the ECO data and insert the ECOs into the physical design for the integrated circuit being analyzed. For example, the ECO file can have a format that allows the output to be transported to layout tools, such as those supplied by Magma Design Automation, Inc., Synopsys, Inc., and Cadence Design Systems, Inc.

In one embodiment, the ECO output has the following format:

<instance name><pin><delay element type> where the <instance name> tells the subsequent ECO placer tool which cell instance in the original design gets connected to the new cell/delay element. In the above example, this would be the first downstream cell from the element that was identified in step 22. The <pin> defines the pin of that cell to which the new cell/delay element gets attached. The <delay element type> defines which delay element from the delay element table should be inserted and connected to the <instance name>.

As shown by arrow 32, method 10 can be run through multiple iterations. Each iteration includes creating timing reports, analysis of those timing reports and creation of an ECO file for fixing one or more hold violations identified by the timing reports. However, the timing information can be updated at other regular or irregular intervals or times. For example, the timing information provided by the static timing analysis tool could be updated with each iteration of step 24.

Once all iterations have been completed (or alternatively after each iteration), the resulting ECO files are provided to a placement program for inserting the ECOs into the physical design. The placement is then done based on the location of the placed instance, <instance name>, and available space for the new delay element. The placement program implements the ECO by automatically creating a new instance name for the cell (of type <delay element type>) it is placing. Based on the ECO file data, the ECO placer program will do the following:

1. create a new instance;
2. unconnect the net from the named <pin> (such as pin "A") of the named existing instance, <instance name>;
3. insert the new instance (cell/delay element type declared);
4. connect the unconnected net (from the output pin/port of the upstream instance) to the input port of the new instance;
5. create a new net;

6. connect the new net to the output (z) port of the new instance;

7. connect the new net to the input (A) port of the existing, downstream instance.

Method 10 may be implemented as an automatic script or a computer program, for example. A person of ordinary skill in the art can therefore implement one or more of the processes or process steps described in the above-description and/or drawings as processor executable instructions, which can be stored on any form of computer readable media. Computer readable mediums can be any available media that can be accessed by a computing device or processor and include volatile media, nonvolatile media, removable media and non-removable media. Examples of such media include, but are not limited to, RAM, ROM, EEPROM, PCMCIA cards, flash memory or other memory technology, CD-ROM, digital versatile disks (DVD) or other optical disk storage, magnetic cassettes, magnetic tape, magnetic disk storage or any other medium that can be accessed by a computing device or processor. Elements of the processes can be stored on the media as computer readable instructions, data structures, program modules or other data, for example.

1. EXAMPLE 1

Figure 2:
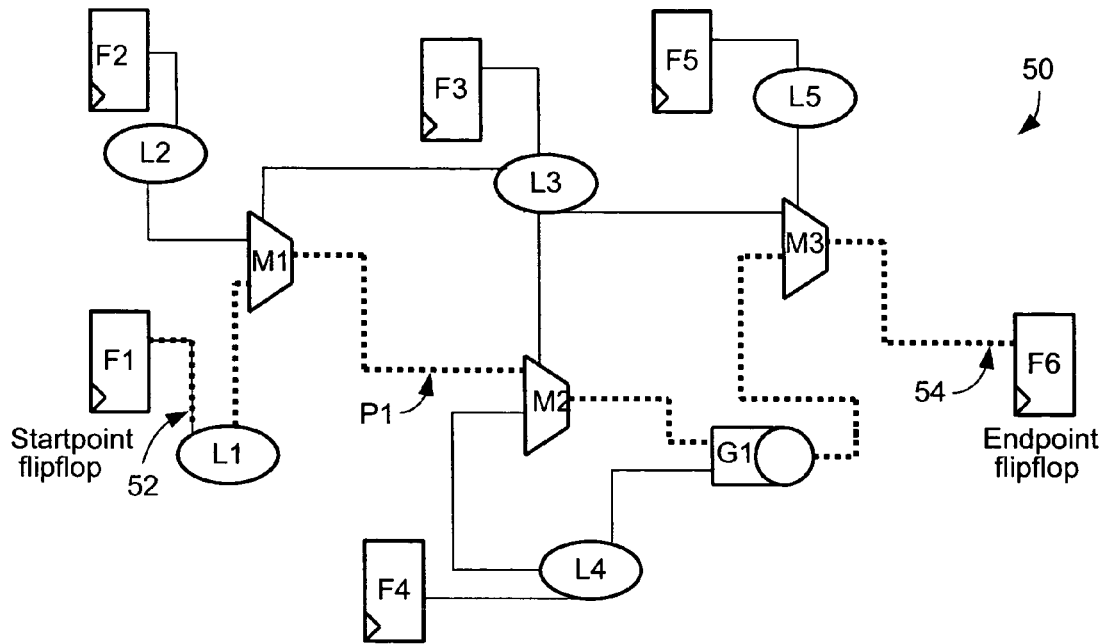
FIG. 2 illustrates a simplified schematic diagram of an IC design to which the method shown in FIG. 1 can be applied.

FIG. 2 illustrates a simplified schematic diagram of a design 50 to which method 10 shown in FIG. 1 can be applied to fix a hold violation. Schematic 50 includes storage elements F1-F6, logic blocks L1-L5, multiplexers M1-M3 and a gate G1, which are interconnected by a plurality of interconnect paths. In the embodiment shown in FIG. 1, storage elements F1-F6 are flip-flops. Path P1 interconnects the output of flop-flop F1 to the input of flip-flop F6 through various elements including L1, M1, M2, G1 and M3. Path P1 is illustrated as a dashed line for illustration purposes. Flip-flop F1 can be considered the start point of path P1, and flip-flop F6 can be considered the end point of path P1. In this example it is assumed that the logic elements in logic blocks L1-L5 each have a fanout of one.

If the data input of F6 has a hold violation, then the method shown in FIG. 1 can be used to locate the optimal location for placing an additional delay element to fix the violation. Applying the tracing algorithm, which is illustrated in steps 20 and 22 of FIG. 1, between flip-flops F1 and F6, method 10 results in selecting the first input pin of path P1 (location 52) that is downstream of the start point. Since none of the elements along path P1 has a fanout of greater than one, method 10 traces all the way back from flip-flop F6 to the start point at flip-flop F1.

As shown in FIG. 2, flip-flop F6 is the common end point for paths starting at flip-flops F1, F2, F3, F4 and F5. If a delay element were placed at location 54, as dictated by the industry standard method, all of the other paths would be affected. In turn, new setup violations within these paths may be introduced. By inserting the delay element near F1 at location 52 in this example, the risk of affecting other paths is minimized.

2. EXAMPLE 2

Figure 3:
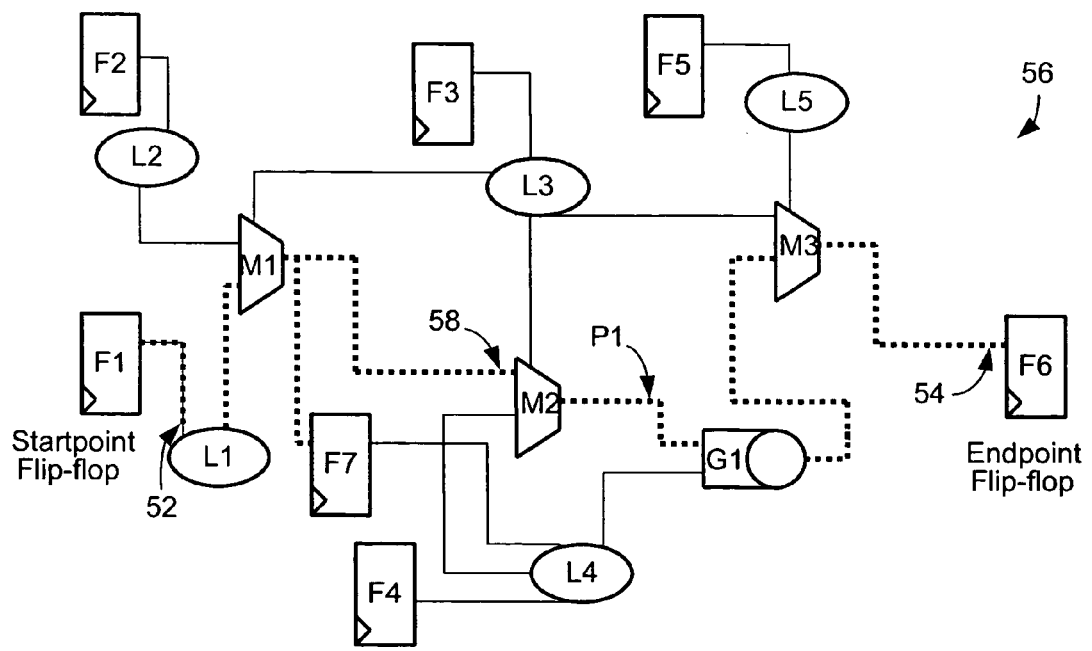
FIG. 3 is a simplified schematic diagram of a further IC design 5 to which the method shown in FIG. 1 can be applied.

FIG. 3 is a simplified schematic diagram of an IC design 56 in which the tracing algorithm does not reach the start point F1, but rather stops at location 58. The same reference numerals are used in FIG. 3 as were used in FIG. 2 for the same or similar elements. In this example, IC design 56 further includes a flip-flop F7 coupled between the output of multiplexer M1 and logic L4. Therefore, multiplexer M1 has a fanout of two. As the tracing algorithm traces back through path P1, from flip-flop F6, the algorithm passes through M3, G1 and M2 until it reaches M1, which has a fanout of two. At this point, the tracing algorithm stops since multiplexer M1 has an output that is coupled to two input pins, one at flip-flop F7 and one at multiplexer M2. The input pin of multiplexer M2 is the first input pin along path P1 that is downstream of the element (multiplexer M1) that was reached having a fanout that is greater than one. Method 10 would therefore insert a delay element onto the input pin of multiplexer M2, at location 58.

As was shown in FIG. 2, placing a delay element further up the path minimizes the collateral affect of the resulting ECO. In this case, only the paths starting at flip-flop F1 and F2 are affected. However if the insertion of a delay delay element at location 58 induces a setup violation for the path start in at flip-flop F2 and terminating at flip-flop F6, then the user is warned of the "hard violation", at step 26 in FIG. 1.

A program was developed which implements the method shown in FIG. 1 and was tested on sample designs. The computer program parses the timing report from an STA tool and determines the optimal location for delay element insertion. The delay element types that were available for selection were selected from a hard coded table based upon statistical analysis several similar designs. The output of the program was an ECO file.

When applied to the test design, the computer program had exceptional results. Iteration periods had been reduced from hours to minutes while the quality of the resulting STA reports showed that the tool had selected the correct delay elements. The results are shown in the graph illustrated in FIG. 4. The X-axis represents the iteration number (iterations of the method shown in FIG. 1, at arrow 32). Below the X-axis, the Y-axis represents time in nanoseconds. Above the X-axis, the Y-axis represents number of violations. Curve 100 plots the total slack time (violation) as a function of iteration. Curve 102 plots the total number of violations as a function of iteration.

Figure 4:
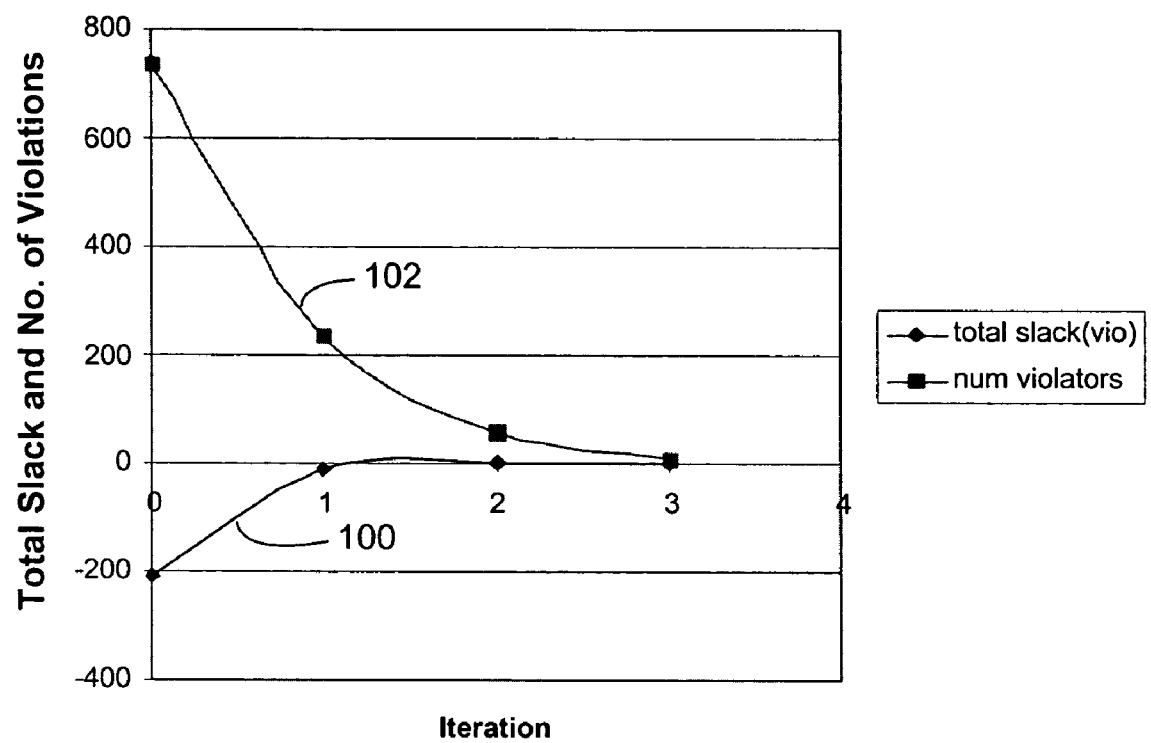
FIG. 4 is a graph, which plots total slack time and total number of violations for a test design as a function of iteration of the method shown in FIG. 1.

In the example shown in FIG. 4, the test design initially had 736 hold violations, representing a total hold violation time of 239.37 nanoseconds, and had 16 setup violations. After the first iteration, the number of hold violations was reduced to 233, which had a total hold violation of 11.0474 nanoseconds. The first iteration caused only three setup violations. After the second iteration, the number of hold violations was reduced to 103, representing a total hold time violation of 2.4549 nanoseconds. The second iteration caused only three setup violations.

Even though 103 hold violations remained after the second iteration, the magnitude of the remaining violations were below 60 picoseconds, which represented a significant decrease. It is not required that the highly selective method be used to fix every hold violation. Rather, the method can be used to reduce the total number of violations and violation time to a manageable number. The remaining violations can then be manually reviewed by the user or with other tools. This allows the user to focus on the more significant problem areas rather than trying to fix hundreds of hold violations in a somewhat random manner.

As a result, the method and apparatus discussed above can be used to relieve much of the manual effort required by the designer in order to search through STA reports. As a result of the minimization of effort, the method and apparatus may be used earlier within the design flow, with quicker iteration times. Ultimately, a significantly shorter cycle time may be achieved. For example, the process of manually reviewing the timing reports, identifying a thousand or more hold violations and then creating a fix can consume days of analysis and typing. With the automated process described above, the time required to analyze and fix a large portion of the total number of hold violations can be reduced to a few minutes. Remaining "problem areas" can then be manually reviewed and analyzed in a very short period of time. Further, the industry standard method may require many iterations, such as 10 or more, in order to reduce the number of violations significantly, while the new automated, highly selective method may require only about two or three iterations. However, any number of iterations may be performed as desired.

Although the present disclosure has been described with reference to preferred embodiments, workers skilled in the art will recognize that changes may be made in form and detail without departing from the scope of the invention.

What is claimed is:

1. A method comprising:
    (a) using an analysis tool, tracing upstream along a path within a design of an integrated circuit that corresponds to a hold violation, from an end point of the path toward a start point of the path, until an element is reached along the path that has a fanout exceeding a predetermined fanout limit; and
    (b) generating an output that defines a location in the design at which to insert a delay element, the location being defined based on the element reached in (a).

2. The method of claim 1, wherein the location defined in the output generated in step (b) is coupled to an input of an element along the path that is immediately downstream of the element reached in (a).

3. The method of claim 2 wherein the location is defined such that the delay element has an output that is connected only to the input of the downstream element.

4. The method of claim 1 wherein the output comprises a computer-readable engineering change order (ECO) file.

5. The method of claim 1 and further comprising:
    (c) prior to step (a), inputting data from a timing report for the design and identifying the hold violation from the timing report.

6. The method of claim 5 and further comprising:
    (d) repeating steps (a)-(c) for each of a plurality of hold violations identified from the timing report;
    (e) inputting data from an updated timing report for the design from a static timing analysis tool, which has been updated to reflect the delay elements inserted in each iteration of step (b); and
    f) further repeating steps (a)-(c) for each of a plurality of further hold violations identified from the updated timing report.

7. The method of claim 1, wherein the start point and the end point comprise storage elements.

8. The method of claim 1, wherein steps (a) and (b) are automated steps implemented through instructions executed by a computing device.

9. The method of claim 1 and further comprising:
    c) selecting the delay element from a delay element table comprising a plurality of different delay element types, which have different delays, based on a magnitude of the hold violation.

10. The method of claim 9 wherein step (c) comprises:
    (c) selecting the delay element from a delay element table comprising a plurality of different delay element types, which have different delays, based on a magnitude of the hold violation of the path and a magnitude of a setup time margin for that path.

11. ) The method of claim 9 and further comprising:
    (d) prior to step (c), inputting a timing report for the design, generating the delay element table, inserting the plurality of different delay element types into the delay element table, and, for each different delay element type, assigning delay values to that delay element type based on a mathematical combination of delay values from the timing report for different instances of that delay element type that are included in the design.

12. The method of claim 1, further comprising:
    (c) terminating the tracing in step (a) when an element is reached along the path that corresponds to the start point and an element has not previously been reached along the path that has a fanout exceeding the predetermined fanout limit.

13. A computer-readable medium having computer-executable instructions that cause a computer to perform steps comprising:
    (a) tracing upstream along a path within a design of an integrated circuit that corresponds to a hold violation, from an end point of the path toward a start point of the path, until an element is reached along the path that has a fanout exceeding a predetermined fanout limit; and
    (b) generating an output that defines a location in the design at which to insert a delay element, the location being defined based on the element reached in (a).

14. The computer-readable medium of claim 13 wherein the location defined such that the delay element has an output that is coupled only to an element along the path that is immediately downstream of the element reached in (a).

15. The computer-readable medium of claim 13 further comprising:
    (c) prior to step (a), inputting data from a timing report for the design and identifying the hold violation from the timing report.

16. The computer-readable medium of claim 15 further comprising:
    (d) repeating steps (a)-(c) for each of a plurality of hold violations identified from the timing report;
    (e) inputting data from an updated timing report for the design from a static timing analysis tool, which has been updated to reflect the delay elements inserted in each iteration of step (b); and
    (f) further repeating steps (a)-(c) for each of a plurality of further hold violations identified from the updated timing report.

17. The computer-readable medium of claim 13, wherein the start point and the end point comprise storage elements.

18. The computer-readable medium of claim 13 further comprising:
    (c) selecting the delay element from a delay element table comprising a plurality of different delay element types, which have different delays, based on a magnitude of the hold violation.

19. The computer-readable medium of claim 18 wherein step (c) comprises:
    (c) selecting the delay element from a delay element table comprising a plurality of different delay element types, which have different delays, based on a magnitude of the hold violation of the path and a magnitude of a setup time margin for that path.

20. The computer-readable medium of claim 18 further comprising:
    (d) prior to step (c), inputting a timing report for the design, generating the delay element table, inserting the plurality of different delay element types into the delay element table, and, for each different delay element type, assigning delay values to that delay element type based on a mathematical combination of delay values from the timing report for different instances of that delay element type that are included in the design.

21. The computer-readable medium of claim 13, wherein the steps further comprise:
(c) terminating the tracing in step (a) when an element is reached along the path that corresponds to the start point and an element has not previously been reached along the path that has a fanout exceeding the predetermined fanout limit.

22. An apparatus comprising:
a delay element table comprising a plurality of different delay element types and assigning a respective delay to each of the delay element types based on a mathematical combination of delay values from a timing report for different instances of that delay element type that are included in a design of an integrated circuit; and
a hold violation analysis tool, which is adapted to input data from a timing report for the design to identify a hold violation in the design, trace upstream along a path corresponding to the hold violation, from an end point of the path toward a start point of the path, until an element is reached along the path that corresponds to the start point or has a fanout exceeding a predetermined fanout limit, select a delay element from the plurality of different delay element types in the delay element table, and generate an output file that defines a location in the design at which to insert the delay element, such that the delay element is coupled to an input of an element along the path that is immediately downstream of the element reached along the path.

* * * * *